US009069656B2

(12) United States Patent
McLachlan et al.

(10) Patent No.: US 9,069,656 B2
(45) Date of Patent: Jun. 30, 2015

(54) OBFUSCATING FUNCTION RESOURCES WHILE REDUCING STACK CONSUMPTION

(71) Applicant: Apple Inc., Cupertino, CA (US)

(72) Inventors: Jonathan G. McLachlan, San Francisco, CA (US); Julien Lerouge, San Jose, CA (US); Nicholas T. Sullivan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 365 days.

(21) Appl. No.: 13/631,851

(22) Filed: Sep. 28, 2012

(65) Prior Publication Data

US 2014/0095812 A1 Apr. 3, 2014

(51) Int. Cl.

| | |
|---|---|
| ***G06F 12/00*** | (2006.01) |
| ***G06F 12/02*** | (2006.01) |
| ***G06F 21/14*** | (2013.01) |
| ***G06F 21/54*** | (2013.01) |
| ***G06F 21/79*** | (2013.01) |
| *G06F 9/45* | (2006.01) |

(52) U.S. Cl.

CPC ...... *G06F 12/023* (2013.01); *G06F 2212/1052* (2013.01); *G06F 21/14* (2013.01); *G06F 21/54* (2013.01); *G06F 21/79* (2013.01); *G06F 2221/2107* (2013.01); *G06F 8/41* (2013.01)

(58) Field of Classification Search

None

See application file for complete search history.

(56) References Cited

U.S. PATENT DOCUMENTS

| | | | |
|---|---|---|---|
| 7,111,294 | B2 | 9/2006 | Steensgaard |
| 2003/0221085 | A1 * | 11/2003 | Huras ........................ 711/220 |
| 2009/0307669 | A1 | 12/2009 | Gartst, Jr. et al. |
| 2012/0089966 | A1 | 4/2012 | Martin et al. |

OTHER PUBLICATIONS

"x86 Disassembly, Exploring the relationship between C, x86 Assembly, and Machine Code," Wikibooks: Collections, PDF generated using the open source mwlib toolkit, Wed.. Sep. 19, 2012 03:01:08 UTC, 146 pages.

* cited by examiner

*Primary Examiner* — Baboucarr Faal

(74) *Attorney, Agent, or Firm* — Blakely, Sokoloff, Taylor & Zafman LLP

(57) ABSTRACT

In one embodiment, a system wide static global stack pool in a contiguous range of random access memory is generated, a block of memory in the system global pool is assigned to a thread of a running process, and the thread stores local variable information in static global stack pool, such that the local variable is hidden from a stack frame back-trace. In one embodiment, a dynamically allocated data structure in system heap memory is generated, the data structure is locked to ensure atomic access, a block of memory in the data structure is assigned to a thread of a process, the data structure is unlocked, and the thread stores local variable information in static global stack pool, such that the local variable is hidden from a stack frame back-trace.

20 Claims, 12 Drawing Sheets

*Runtime Object Modification System - 800*

*Diagram of Program Memory Space - 200*

*Schematic View of the Stack - 300*

*Stack After Malicious Buffer Overflow - 400*

*Alternate Stack Pool - 500*

*Function Stack Frame Preparation - 600*

Runtime Object Modification System - 800
Processing System 810
System Memory (e.g. DRAM) 820
System Runtime 825
Object Code Modification 827
Stack Manager 828
Application Execution 834
Application Launch Framework 832
Operating System 822
Nonvolatile Memory 815
Process Memory Space 840
Process Stack 845
Local Variables 842
Static Stack Pool 850
Overflow Link 853
Dynamic Stack Pool 855

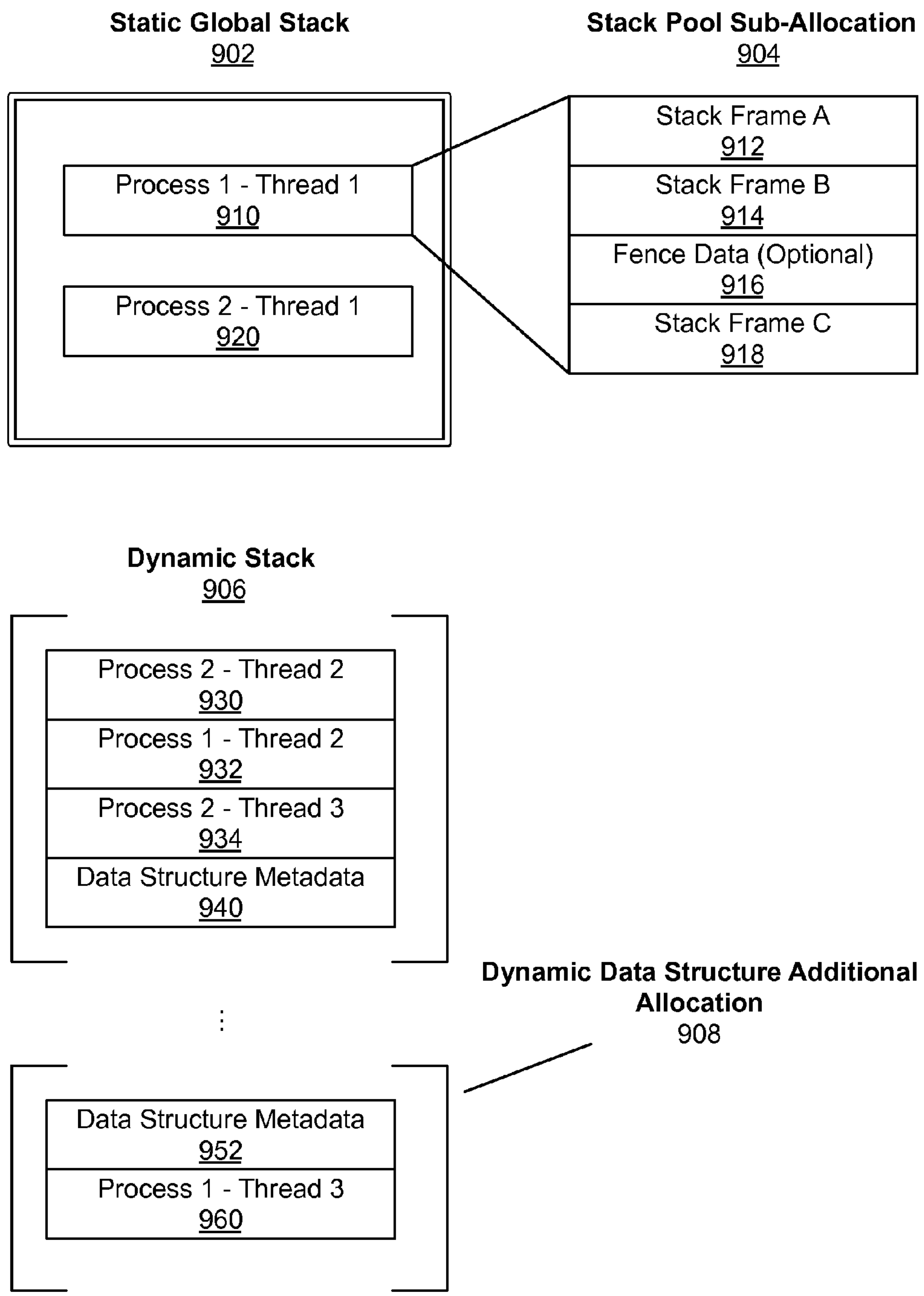
Fig. 9
Schematic View of Stack Allocation per Thread - 900
Static Global Stack
902
Stack Pool Sub-Allocation
904
Process 1 - Thread 1
910
Process 2 - Thread 1
920
Stack Frame A
912
Stack Frame B
914
Fence Data (Optional)
916
Stack Frame C
918
Dynamic Stack
906
Process 2 - Thread 2
930
Process 1 - Thread 2
932
Process 2 - Thread 3
934
Data Structure Metadata
940
Dynamic Data Structure Additional Allocation
908
Data Structure Metadata
952
Process 1 - Thread 3
960

Obfuscated Stack Allocation in Pre-Allocated Stack - 1000

OBFUSCATING FUNCTION RESOURCES WHILE REDUCING STACK CONSUMPTION

BACKGROUND OF THE DISCLOSURE

Any application that accepts input from a user, from a file, or from the network has to store that input, at least temporarily. Except in special cases, most application memory is stored in one of two places, either the stack or the heap. The heap provides general-purpose storage for an application, and memory that is dynamically allocated by a program generally will be allocated within the program's heap. Alternatively, the stack is a part of an application's address space devoted to storing data specific to a particular instance of a construct, such as, for example, automatically allocated function local variables. Local variables in a function are typically placed on the call stack frame for that function. When the function is called, the stack grows, allocating space for all the local variables required. Stack space is a limited resource, however, and once a process runs out of stack space, it can not make any additional function calls because the return address and frame pointers also consume space on the stack. This pressure to operate within a constrained space is even greater on mobile devices with limited memory, or inside the kernel of an OS.

Additionally, controlling the visibility of allocations in stack space creates a special kind of access control problem. Without some additional security, sensitive data stored in a program's stack could become vulnerable to unwanted access by reverse engineers. Reverse engineering is one process by which secure or protected aspects of data, software or hardware products can be uncovered through the analysis of the operation of the products. The stack is especially vulnerable to reverse engineering in that it can be inspected to determine how many local variables are required by a particular function to operate, or to determine the call graph of a program. The stack can be parsed and traversed at runtime, revealing the entire call stack (the list of functions and call sites currently invoked in a running program). Almost all debuggers and reverse engineering tools take advantage of this well-known and understood stack convention.

One manner of protecting a program's local variables against reverse engineers is to use data obfuscation to make the reverse engineering of program data structures more difficult. Data obfuscation is a technique in which data stored in memory is scrambled, encrypted, rearranged or relocated in a manner that makes it difficult for an external user or program to make use of protected data should it be accessed by unauthorized parties.

SUMMARY OF THE DESCRIPTION

The embodiments described relate to techniques, methods, and systems for obfuscating a function's resources while reducing stack consumption. In one embodiment, a runtime system can statically pre-allocate a system global pool in a contiguous range of random access memory, assign a block of memory in the system global pool to a thread of a running process, and modify a process's machine code to store a local variable of a function of the thread in the block of allocated memory, such that the local variable is hidden from a stack frame back-trace.

In one embodiment, a runtime system can dynamically allocate a data structure in system memory, lock the data structure to ensure atomic access; assign a block of memory in the data structure to a thread of a process, unlock the data structure, and modify a process' machine code to store a local variable of a function of the thread in the block of allocated memory, such that the local variable is hidden from a stack frame back-trace.

In one embodiment, a compiler can generate machine code to dynamically allocate a data structure in system memory, request a lock of the data structure to ensure atomic access; request a block of memory in the data structure, assign the block of memory to a stack frame of a function in an application, release the lock on the data structure, and store a local variable of a function in the block of requested memory, such that the local variable is hidden from a stack frame back-trace.

In one embodiment, a compiler can generate machine code to, request an allocation on a system global stack pool, assign the allocated memory to a stack frame of a function in an application, and store a local variable of a function in the block of allocated memory, such that the local variable is hidden from a stack frame back-trace.

The various embodiments herein described can be implemented in numerous ways, including as a method, system, device, and computer readable medium. The above summary does not include an exhaustive list of all aspects of the present invention. It is contemplated that the invention includes all systems and methods that can be practiced from all suitable combinations of the various aspects summarized above, and those disclosed in the Detailed Description below.

BRIEF DESCRIPTION OF THE DRAWINGS

The present invention is illustrated by way of example and not limitation in the figures of the accompanying drawings in which like references indicate similar elements, and in which:

FIG. 9 is a block diagram illustrating a schematic view of stack allocation per thread according to one embodiment of the invention;

DETAILED DESCRIPTION

Various aspects of data manipulation and memory management methods that obscure function local variables and protect against malicious attack or reverse engineering will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
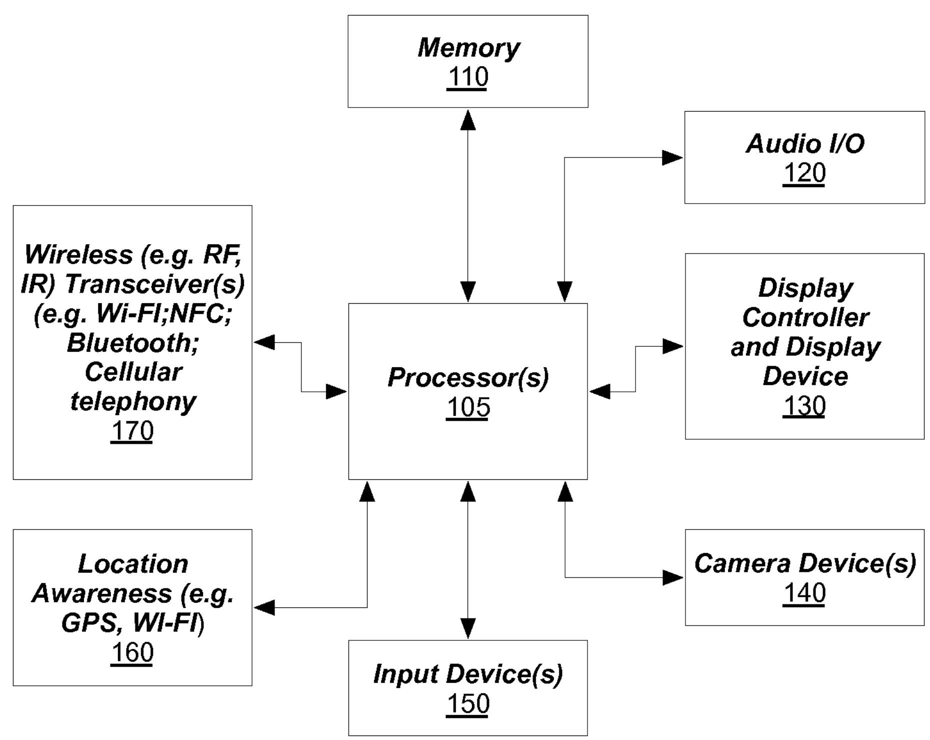
FIG. 1 is a block diagram of one embodiment of a data processing system that utilizes stack obfuscation according to one embodiment of the invention.

FIG. 1 is a block diagram of one embodiment of a data processing system that utilizes stack obfuscation according to one embodiment of the invention. The data processing system 100 includes a processing system 105 with one or more microprocessors. The system 100 also includes memory 110 for storing data and programs for execution by the processing system. The system 100 additionally includes an audio input/output subsystem 120 which may include a microphone and a speaker for playing back music or providing telephone functionality through the speaker and microphone.

A display controller and display device 130 can be used to provide a graphical user interface for the user, such as the graphics user interface provided by iOS devices such as the iPhone, iPad and iPod touch. A wireless transceiver 170 can transmit and receive data via one or more wireless technologies such as Wi-Fi, infrared, Bluetooth, or one or more variants of wireless cellular technology. One embodiment of system 100 contains one or more camera devices 140 configured in both a front and rear facing configuration, though similarly configured systems each with a front facing camera can be one of many optimal configurations. The data processing system 100 can also include one or more input devices 150 that allow a user to provide input to the system. Input devices can include a keypad or keyboard, alone or in conjunction with a touch or multi touch panel that is overlaid on the display device 130. Additionally, embodiments of the data processing system 100 can also include a device for providing Location Awareness 160 services, such as a Global Positioning System (GPS) device or its equivalent.

It is to be noted that the data processing system 100 as represented in FIG. 1 is by way of example. One or more buses or interfaces, which are not shown, can be used to interconnect the various components, as is well known in the art. As well, additional components, not shown, may also be part of the system 100 in certain embodiments, and in certain embodiments, fewer components than shown in FIG. 1 may also be used. It is also to be noted that reference in this specification to "one embodiment" or "an embodiment" mean that a particular feature, structure, or characteristic described in conjunction with the embodiment can be included in at least one embodiment of the invention. The appearances of the phrase "in one embodiment" in various places in the specification do not necessarily all refer to the same embodiment.

Data processing systems such as the one illustrated in FIG. 1 can utilize some form of operating system to manage the system, and in most operating systems, each process, or running application, has a stack. In the case of multithreaded applications, each thread has a stack as well. The stack can be divided into units called stack frames. In computing systems as are known in the art, each stack frame contains all data specific to a particular call to a particular function. This data typically includes the function's parameters, the complete set of local variables within that function, and linkage information—that is, the address of the function call itself, where execution continues when the function returns. Depending on compiler flags, it may also contain the address of the top of the next stack frame. The exact content and order of data on the stack depends on the precise operating system and processor architecture in use, but will be understood that the concepts discussed are not limited to a specific processor architecture.

Figure 2:
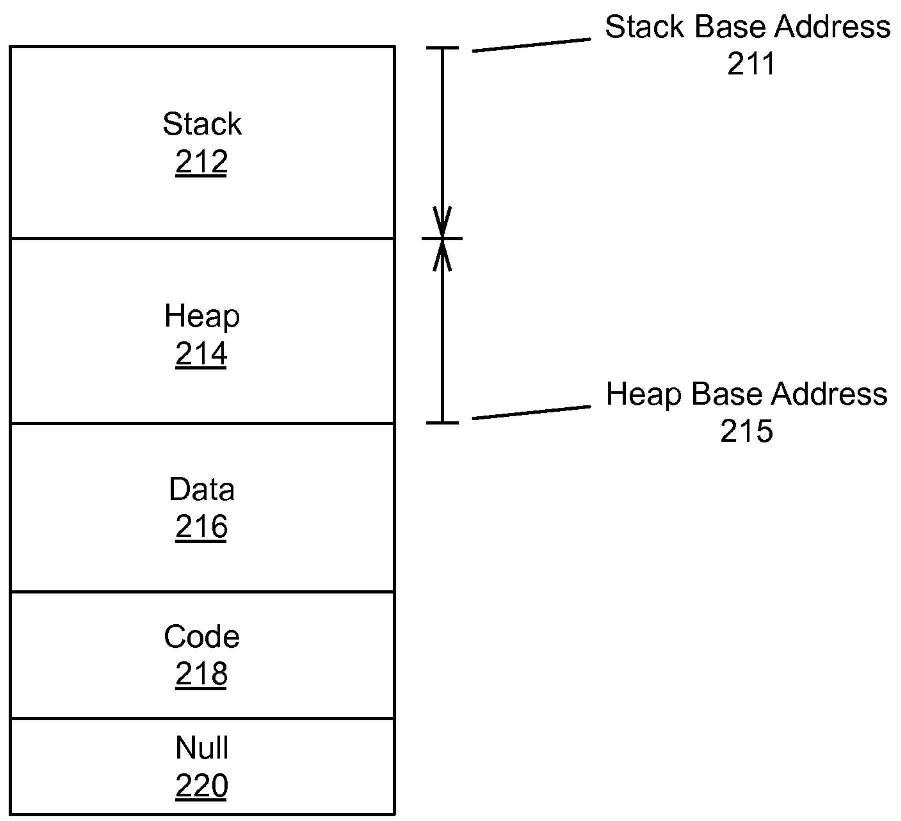
FIG. 2 is a block diagram of an example executable program memory space when the program is a running process in system memory.

FIG. 2 is a block diagram of one example executable program memory space, as is generally known in the art, when the program is a running process in system memory. The executable program can contain compiled program code and data that is stored in one or more files of the nonvolatile storage of a data processing system, such as, for example, the data processing system 100 of FIG. 1. To execute the program, the program's binary code is typically loaded into the system's volatile memory at a certain address. In one embodiment of the data processing system, an executable file has sections of data and code split into segments, which contain different types of data for use during the program's execution. For example, a Null 220 segment occupies the first page of an executable program's memory space at a program's virtual memory address zero and cannot be read or written to by the executable program. Accordingly, attempts to access a Null memory address, a common programming error, results in an immediate program crash, rather than a corruption of the next segment, the Code 218 segment, which contains the executable code of the program, and can also contain data declared to be constant. The Data 216 segment is both readable and writable, and contains global program data and static variables that have been initialized by the programmer. The size of the Data 216 segment is determined by the amount of global or static information used by the programmer during the application's development, and generally will not change when the application is a running process in memory.

The Heap 214 and Stack 212 segments are available to an executable program when it is loaded into volatile memory for execution. The relative placement of the Heap 214 and the Stack 212 can vary based on processor architecture, but it is common to have the segments grow towards each other. In this example, the Heap Base Address 215 begins at some point above the virtual memory address where the data segment is loaded into memory, and the Stack Base Address 211 begins at or near the top of the program's virtual memory space. In some operating systems, the top of a program's virtual memory space is mapped into the operating system's kernel, which reduces the available address space for the programs to use. As the stack and heap grow through usage, the address space available to each is reduced.

In most operating systems, each process (running application) has at least one Stack 212. Multithreaded applications have one Stack 212 per thread. The Stack 212 is managed as a stack data structure as is known in the art; it supports push and pop operations and adds and removes data in a Last In First Out (LIFO) manner. The Stack is divided up into units called stack frames. Each stack frame contains all data specific to a particular call to a particular function. This data typically includes the function's parameters, the complete set of local variables within that function, and the address of the function call itself, which is where execution continues when the function call returns.

Each time a function is called, a new stack frame is added to the top of the Stack 212. Each time a function returns, the top stack frame is removed. At any given point in execution, a process can only directly access the data in the topmost stack frame. This design makes recursion possible because each nested call to a function gets its own copy of local variables and parameters, however excessive recursion can exhaust the available stack space.

A process, which makes extensive use of the stack, can encounter "stack pressure" issues due to the fixed size allocation of the stack space. Each process can be launched with specific default stack size, which is designated for use by the main thread of the process. Each subsequent thread created can then be allocated its own default stack. Main thread default stack allocations can be in the Megabyte range, while child thread default stack sizes can be in the Kilobyte range. A process can outgrow its allocated stack space via a number of means. For example, a process utilizing deep recursion or deeply nested function calls can exhaust its stack allocation in part because of the large amount of function return information stored on the stack, in addition to any local variables allocated by functions along the call-stack. Additionally, large allocations of data in the stack, or the use of many concurrent threads can exhaust a process's stack allocation. Processes which run as kernel modules, or kernel extensions, can encounter even greater stack pressure, as in some operating systems, the amount of stack space available to kernel processes is reduced.

Figure 3:
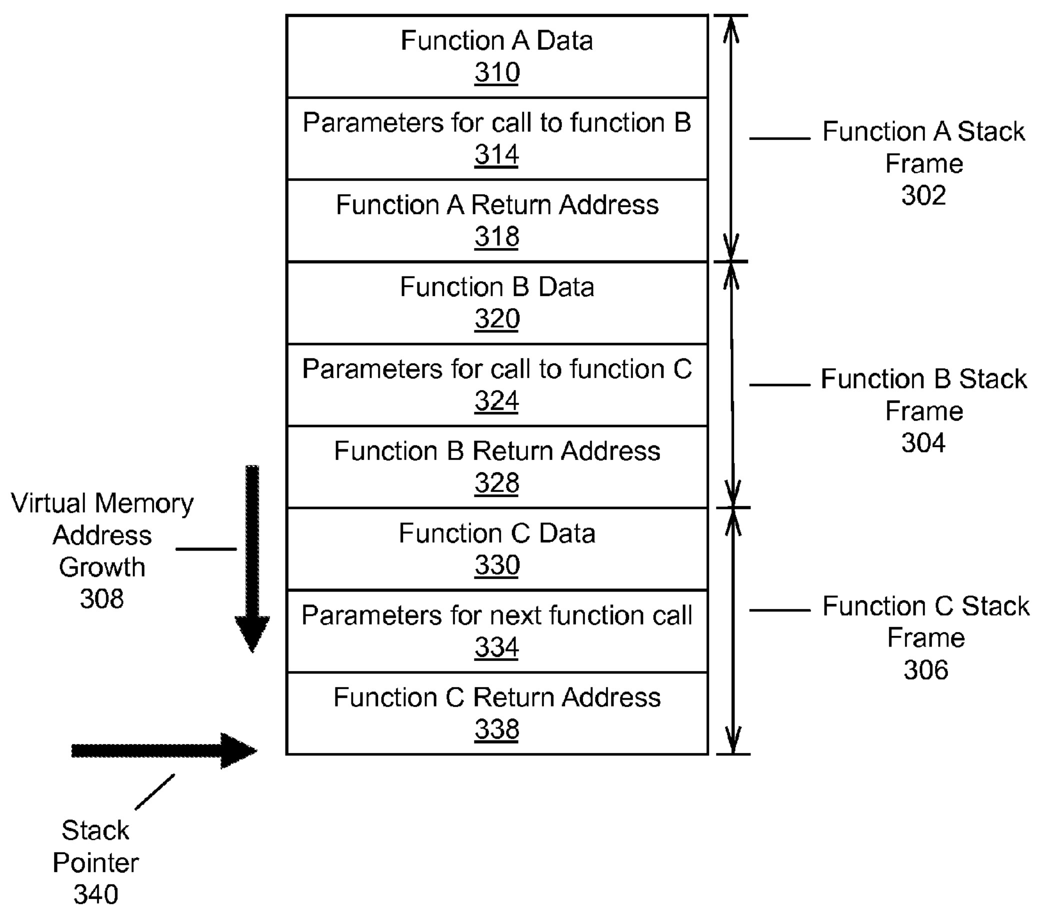
FIG. 3 is a block diagram of an example schematic view of the stack of a running process.

FIG. 3 is a block diagram of an example schematic view of the stack 300 of a running process. As the process executes, a Stack Frame 302 for Function A can contain Data 310, such as local variables. Function A can call into Function B, and the Parameters 314 Function A uses when calling Function B are pushed into the Function A Stack Frame 302, followed by the Return Address 318 of Function A. For stack implementations that grow downward towards the heap memory, each time new data is pushed onto the stack, a Stack Pointer 340 register descends into a lower Virtual Memory Address 308. This process continues for Function B were it to call Function C; Data (e.g. local variables) 320 used for Function B are allocated space on the Function B Stack Frame 304, and Parameters for a call to Function C 324 can be pushed on to the stack before the jump to Function C. Function C Data 330 is allocated space on the Function C Stack Frame 306, and if Function C has any nested functions, Parameters 334 for that function call are pushed on to the stack, followed by the Return Address of Function C 338. It should be evident from this description how deeply nested function calls, including recursive function calls, can exhaust available stack space if used in combination with a large amount of function local data. As the function call stack unwinds, however, stack pressure is reduced. When Function C completes, the Function C Stack Frame 306 is popped off of the stack, during which the Function B Return Address 328 is retrieved for the return jump to Function B; likewise for the Function A Return Address 318 when Function B completes.

Figure 4:
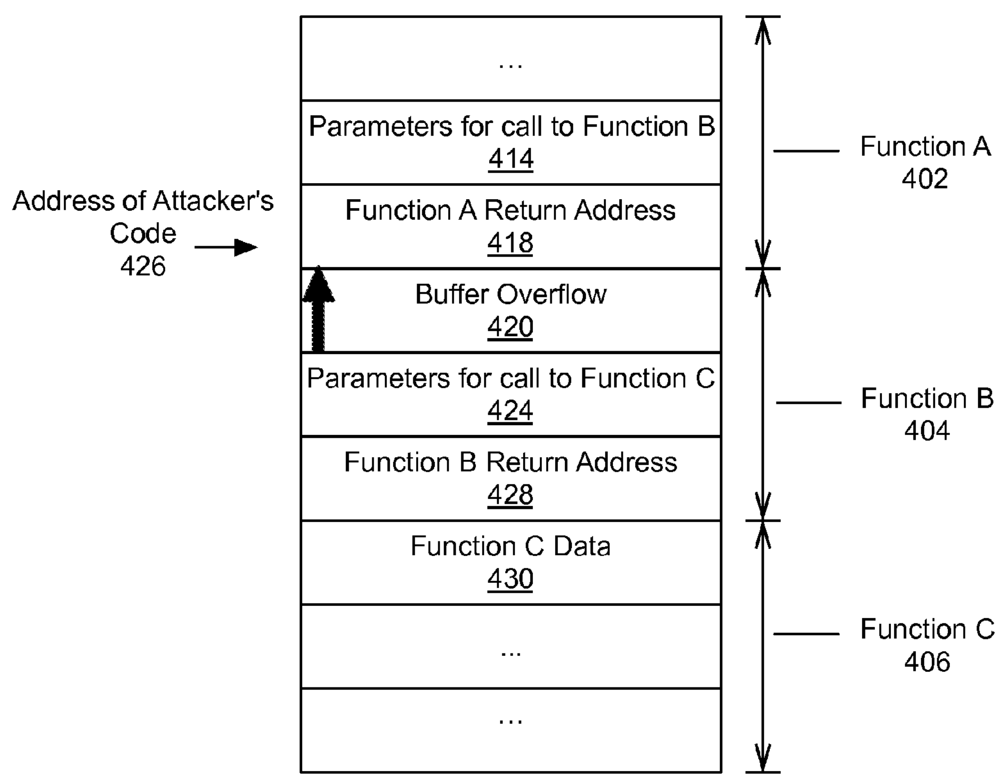
FIG. 4 is a block diagram of the conventional process stack after a malicious buffer overflow attack.

The conventional stack memory model as is known in the art presents problems beyond stack pressure, and can present an issue for data security as well. As an illustration, FIG. 4 is a block diagram of the conventional process stack after a malicious buffer overflow attack 400. A reverse engineer can use disassembly, debugging, and reverse engineering tools to analyze the execution of a program and discover which local variables are used in which manner, and whether any of them can be exploited to gain unauthorized access to data in the data processing system. For example, a reverse engineer can perform an analysis of a conventional stack, such as the stack illustrated in FIG. 3, and find the Parameters 414 for the call to Function B, the Return Address of Function A 418, and that Function A 404 calls into Function B 406 using a parameter, that comes from outside of the process (such as user input or input from a different program). This can set up a potential attack where a pointer to an oversized buffer can be used as parameter for the call Function B 404, which, if copied or stored into a fixed size local buffer in Function B, can cause a buffer overflow into other stack data, including the Return Address 418 for Function A 402. In general, a program should check all input data to make sure it is appropriate for the purpose intended (for example, making sure that an input filename is of legal length and contains no illegal characters). However, in many cases, programmers do not do so, instead assuming that the user will not do anything malicious or unreasonable. This can become an issue when a program accepts user input, and then stores the input in a fixed-size buffer. If the user is malicious (or if the user opens a file that contains data created by someone who is malicious), the user may provide data that is longer than the size of the buffer. In this example, a pointer to an oversized string can be passed as a parameter to Function B 404, which the reverse engineer knows is copied into a local variable. Because a function reserves only a limited amount of space on the stack for local data, when the parameter string is copied into a local buffer, which is stored on the stack, a Buffer Overflow 420 occurs and the local variable overwrites other data on the stack, such as other local variables for Function B 404, and the Function A Return Address 418.

Using this technique, an attacker can overwrite the return address used by a function, substituting the address of the attacker's code 426. Then, when Function B 404 completes execution, rather than returning to Function B 402, it jumps to the attacker's code. In this manner, Function B 404 could also be used to attack Function C 406, using Function C Data 430, or the Parameters 424 for the call to Function C 406. If the application's process can be manipulated into executing the attacker's code, the attacker's code will inherit the user's permissions. If the user is logged on as an administrator (the default configuration in some operating systems), the attacker can take complete control of the computer, reading data from the disk, sending emails, and so forth. In addition to attacks on the linkage information of a program, an attacker can also alter program operation by modifying local data and function parameters on the stack. Using reverse engineering techniques enabled by visibility into local data and function parameters stored on the stack, an attacker can devise a buffer overflow attack that injects altered data into local functions. For example, instead of connecting to the desired host, the attacker could modify a data structure so that your application connects to a different (malicious) host.

The stack memory model described above is conventional amongst several programming languages and operating systems and programmers rely on that usage in application development. Deviating from that convention would, under normal circumstances, require re-writing a very large volume of software that makes use of such convention. Disclosed herein, is a developer transparent system and method, which, in several embodiments, obfuscates a function's resources while reducing stack consumption.

Figure 5:
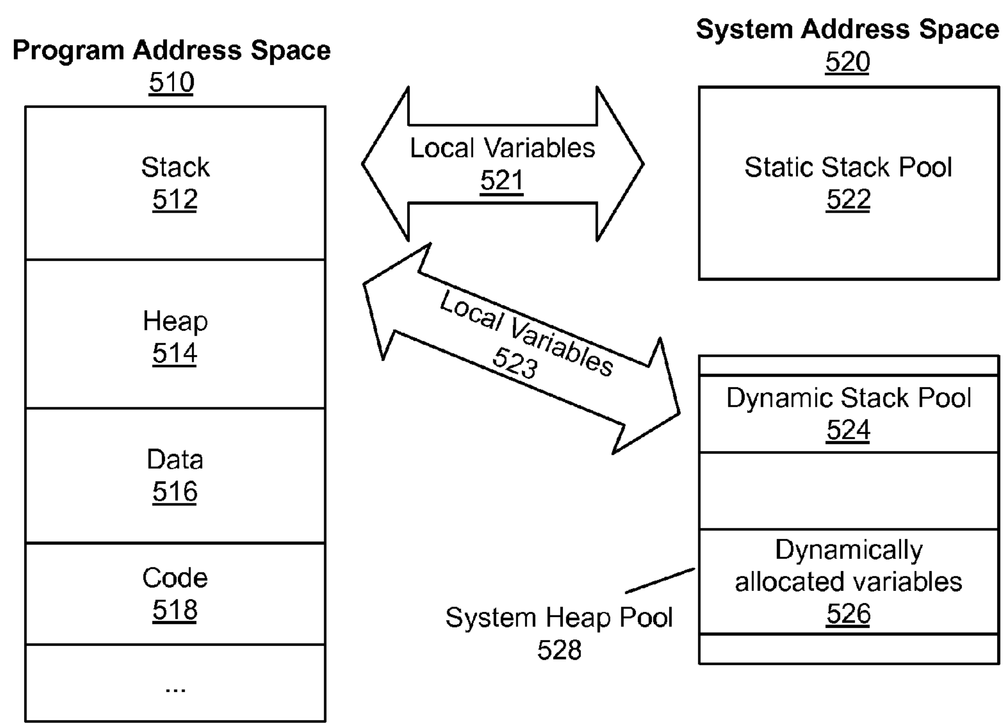
FIG. 5 is a block diagram illustrating one embodiment of stack memory obfuscation utilizing an alternative stack pool outside of program memory space.

FIG. 5 is a block diagram illustrating one embodiment of stack memory obfuscation utilizing an Alternative Stack Pool 500 outside of program memory virtual memory address space. In one embodiment, a data processing system, such as data processing system 100 of FIG. 1, runs an operating system, which, at program load time, can store function local variables in a dedicated Static Stack Pool 522, which is pre-allocated in the system address space 520. The dedicated Static Stack Pool 522 can be pre-allocated at system boot time, or can be allocated for the process at load time, or at some time in between system startup and application load. In one embodiment, the dedicated Static Stack Pool 522 is pre-allocated in a secure memory space, which cannot be accessed by unprivileged processes.

In one embodiment, a dedicated, Static Stack Pool 522 is pre-allocated in a manner that does not allow it to grow in size after allocation. In one embodiment, the pre-allocation is performed only at system start time. In an alternative embodiment, the pre-allocation is performed only in a secure memory region managed and controlled by a system software resource such as a kernel or other trusted software component. Accordingly, in one embodiment, a second, Dynamic Stack 524 can be created in the System Heap Pool 528, which is customarily used for dynamically allocated variable data 526. It is possible that, in some scenarios, using the Dynamic Stack 524 can cause some initial process startup latency resulting from the memory allocation before use. Such cost penalty can generally be avoided in embodiments which relocate function data to the pre-allocated Static Stack Pool 522. However, under certain circumstances, a reduction in performance may be desirable over a stack overflow scenario caused by an exhaustion of the stack. In one embodiment, a process main thread may be allocated an address range in a Static Stack Pool 522, while child threads can be allocated in the Dynamic Stack 524. In such embodiments, processes can be initialized and begin performing single threaded operations while a dynamic stack is allocated and prepared for additional threads of that process.

In one embodiment, Program Address Space 510 arrangement can be unmodified from conventional memory arrangements, in that the Stack 512 and the Heap 514 grow towards each other in the memory space. In one embodiment, linkage information, such as function return addresses and function parameters, can be stored in the conventional Stack 512. Alternatively, some or all of the linkage information can be stored in the Dedicated Stack Pool 522. In one embodiment, the Data 516 segment can be unmodified from the conventional memory arrangement, and can continue to store global and static data for the process. In one embodiment, the Data 516 segment can be re-located at process initialization time to a page or section at the bottom (e.g. highest address or lowest address) of the Dedicated Stack Pool 522 behind the stack base address. In one embodiment, the improved spatial locality between global and local data resulting from the relocated Data 516 segment can, under some circumstances, result in cache or memory management efficiencies.

In one embodiment, all threads of a process share the same address space, such that one thread of a process can access static or global data from a different thread of the same process. However, each thread of a process maintains a separate stack space, resulting in different local variables for each thread. In some programming languages, a software developer can indicate that a thread is to have data storage that is local to the thread, which is not shared with other threads of a process. Various programming languages implement thread local storage differently, however in one embodiment, thread local storage can be implemented by selective relocation of the Data 516 segment when allocating stack space to different threads, such that different versions of the Data 516 segment are used at run-time with different threads. In one embodiment, this can be implemented by relocating the Data 516 segment for one thread of a process, while not relocating the Data 516 for a different thread of the process. Accordingly, each process, which uses the conventional Data 516 segment, can share global data, while threads, which use the relocated Data 516 segment, can share a different version of static and global data. In one embodiment, each thread can have a separate version of the Data 516 segment.

In one embodiment, the Code 518 segment is modified at process initialization time to dynamically adjust the compiled machine code of the executable to implement an embodiment of the invention. When a program is compiled, a prologue and epilogue are generated for the functions to set up and tear down stack space and registers before and after a function. This information forms an activation record for each function, which is used at process runtime. In one embodiment, the runtime system can modify the activation records for functions so that the local variables for each function are loaded into one or more alternative stack pools. In such embodiment, programs, which are compiled using the standard stack convention, can be run with an alternate stack for local variables without requiring code modification or recompilation. In such environment, linkage information can be unchanged, such that a reverse engineer using a debugger, or some other reverse engineering tool, can examine the function call stack, but that examination will not reveal any information as to the local variables used in the function. Without the ability to analyze local variables, many reverse engineering techniques will not be available to a reverse engineer.

In addition to hiding the contents of local variables, the runtime system can isolate the stack frames of each function to prevent a buffer overflow from one function from affecting data in the calling function. While in one embodiment, all stack frames for each function a thread can be allocated in the same stack pool. In an alternative embodiment, using multiple stack pools, each thread can have a separate pool for alternating stack frames, such that, for example, buffer data stored on the stack cannot be easily used to overflow data into the stack frame of a calling function. Alternatively, in one embodiment, each stack frame of a thread can be located in the same stack pool, but at a remote memory location from calling or called functions.

In one embodiment, a compiler or compiler tool can perform the stack relocation methods at compile time. At a software developer's request, via a compiler flag, environment variable, or some other method of indication, the prologue and epilogue of a function can be generated in such a manner that one or more data elements that are normally stored on the stack during a running process (e.g. linkage information, local variable data, parameter data) are instead stored at an alternative stack location. In one embodiment, only the local variable data is stored at an alternative stack location. In one embodiment, the compiler configures the executable program such that a single pool of data is pre-allocated at process load time to store one or more threads. In one embodiment, the compiler can also be configured to allocate one or more stack pools dynamically.

Figure 6:
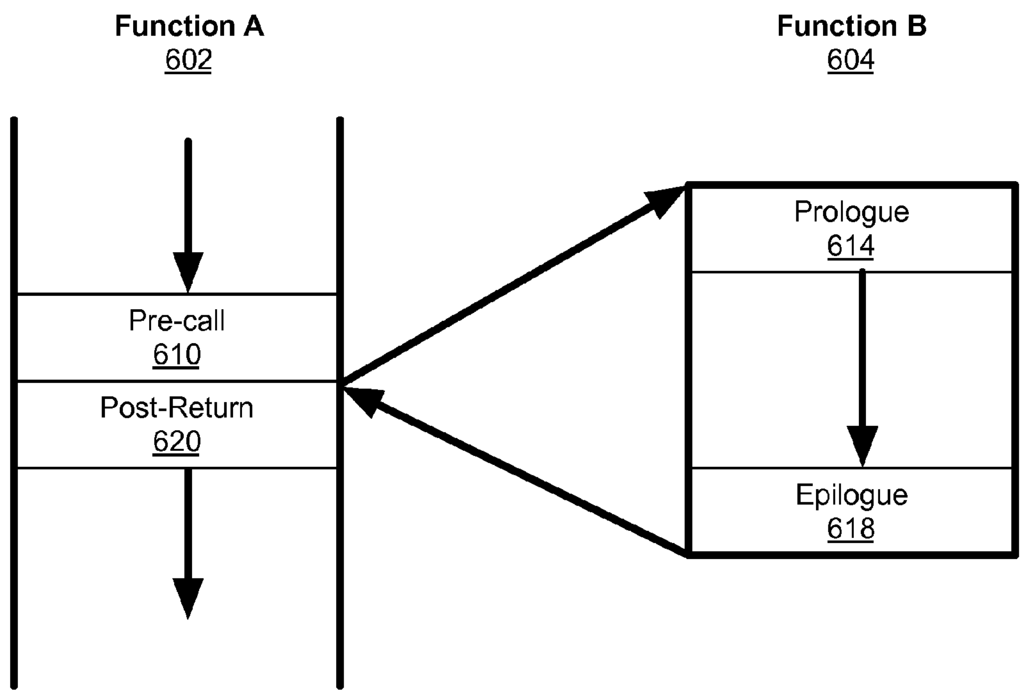
FIG. 6 is a block diagram of one embodiment of function activation records that can be modified to implement an embodiment of stack relocation and obfuscation.

FIG. 6 is a block diagram of one embodiment of function activation records 600 that can be modified to implement an embodiment of stack relocation and obfuscation. In one embodiment, Function A 602 calls into Function B 604. In one embodiment, when the application housing these functions is compiled, machine code can be generated to manage the stack of each function before, during, and after the function call. In one embodiment, a Pre-call 610 region is generated in the calling function (e.g. Function A 602) before the jump to called function (e.g. Function B 604), and a Post-return 620 is added after the return from the called function. In the called function, a Prologue 614 and an Epilogue 618 are generated before and after the machine code of the function.

In one embodiment, the Pre-call 610 section evaluates the arguments the calling function will use to call the called functions, and places those functions on to the stack. In one embodiment, parameters are stored on the system stack in a conventional manner. In one embodiment, parameters are stored in the pre-allocated stack pool or a dynamic stack pool. In one embodiment, all parameters are passed through processor registers. The Pre-call 610 section can, in one embodiment, preserve processor registers in use by the calling function in memory. The Pre-call 610 can also save the address from which the called function will return (e.g. the return address) on a stack.

The Prologue 614 section is generally used to prepare a function stack frame for use by the body of the function. In one embodiment, the space is allocated in the pre-allocated stack pool or a dynamic stack pool and local variable referenced are adjusted by the runtime during stack frame preparation. In one embodiment, a compiler, during function compilation, can adjust local variable references to a dedicated system pre-allocated stack pool, or a stack pool, which will be dynamically allocated during process initialization.

The Epilogue 618 section can be used to tear down the stack frame once the body of a function is complete, and can store any return variables in memory for the calling function to retrieve. In one embodiment, in addition to popping the stack pointer beyond the memory used to store local variables, the stack frame is cleared for additional data security. In one embodiment, the Post-Return 620 section restores saved registers for the calling function and loads the return value into the appropriate memory space for that function. In each of these sections above, references to the system stack can be adjusted dynamically by, in one embodiment, the runtime system, and in one embodiment, a specialized compiler to refer instead to a dedicated or dynamic stack pool in system memory.

Figure 7:
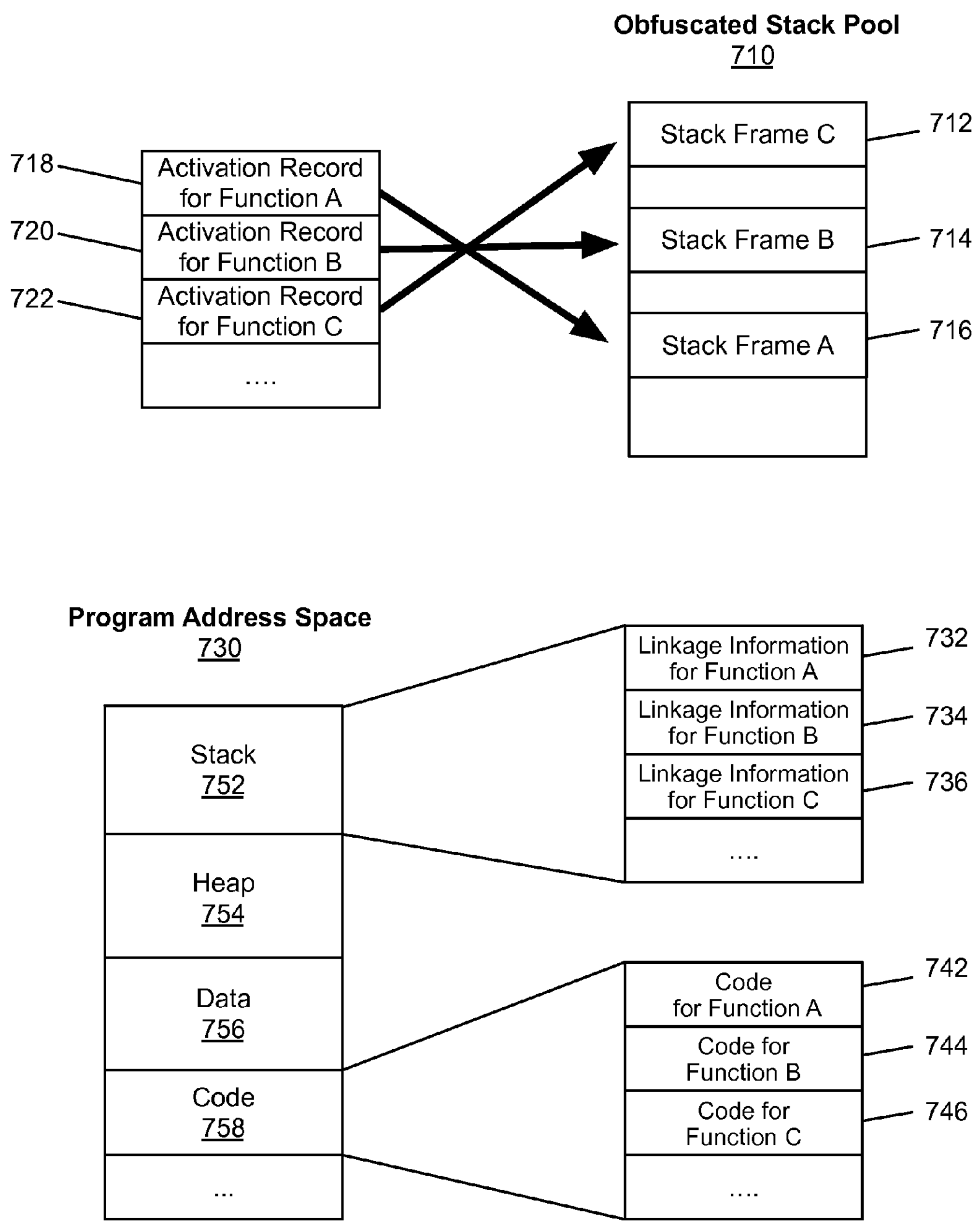
FIG. 7 is a block diagram of a comparison between the system memory stack and an obfuscated stack according to one embodiment of the invention.

FIG. 7 is a block diagram of a comparison between the system memory stack and an obfuscated stack according to one embodiment of the invention. In one embodiment, the dedicated stack is an Obfuscated Stack Pool 710 in which the activation record for a function stack frame is not stored in the conventional manner. For example, the Obfuscated Stack Pool 710 can use a reverse index method that inverts the stack frame order of functions, such that the Activation Record for Function A 718 can be stored in Stack Frame A 716, which is where, in a conventional stack, would store the Activation Record for Function C 722. In this example, the Activation Record for Function B 720 can be stored in Stack Frame B 714, and Stack frame C 712 can store the Activation Record for Function C, in the location that would normally be occupied by Stack Frame A 716. In one embodiment, a full reverse index can be used, and the stack can grow upwards into higher addresses. In one embodiment, the stack frame indexing in the obfuscated stack is reversed but the addressing internal to the frame can grow towards lower memory addressed.

In one embodiment, Program Address Space 730 can store a conventional Stack 752, a conventional Heap 754, a conventional Data 756 segment, and a conventional Code 758 segment. The Code 758 segment can contain Code for Function A 742, Code for Function B 744, and Code for Function C 746. However, the Stack 752 can contain only linkage information, such as linkage information for Function A 732, linkage information for Function B 734, and linkage information for Function C 736, which can be stored in the conventional manner. In such embodiment, no local variables appear on the conventional stack, and a back-trace operation conducted on a conventional debugger will be unable to display local variable information.

Figure 8:
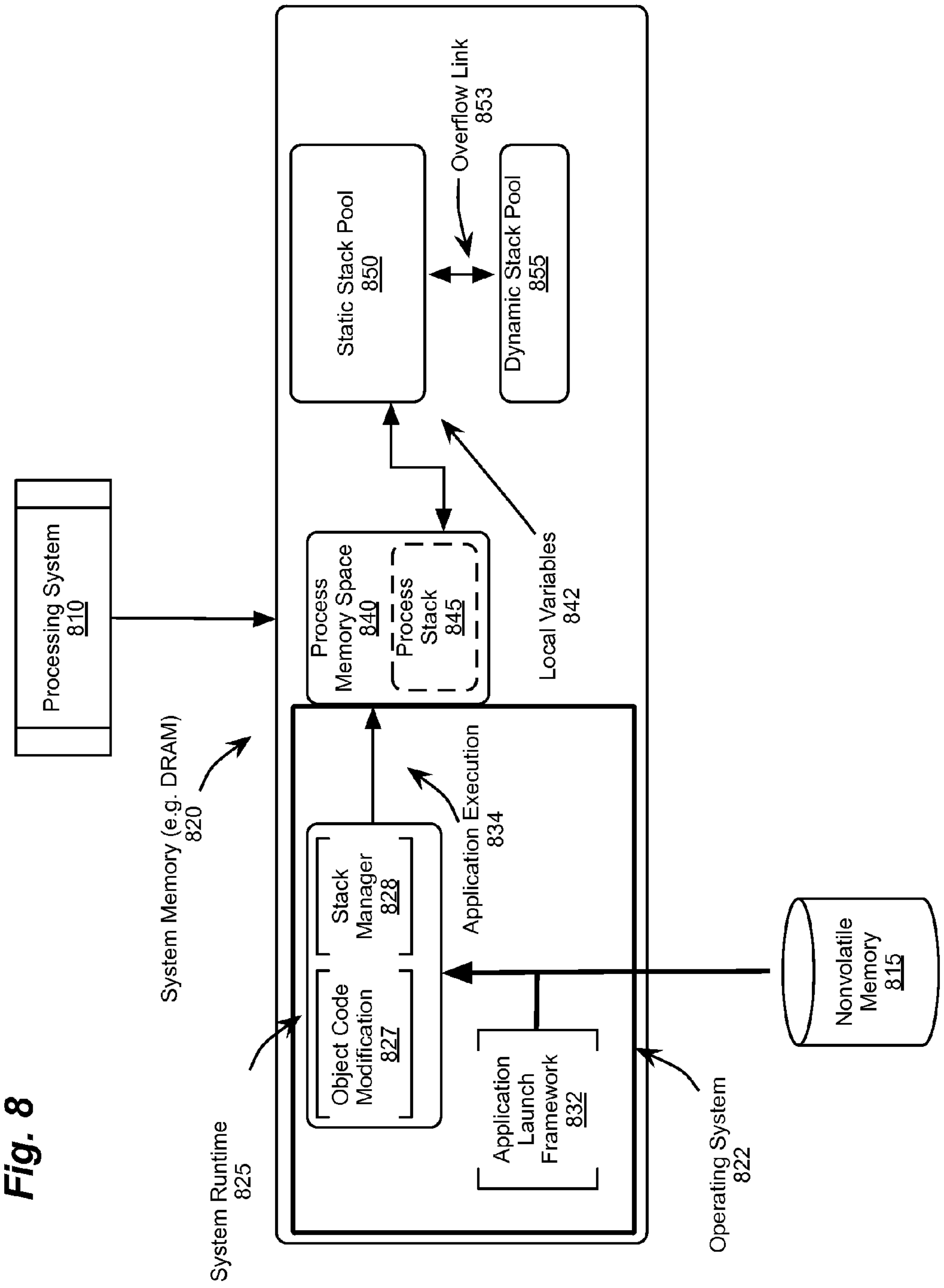
FIG. 8 is a block diagram of an illustration of one embodiment of system runtime which performs or facilitates object file modification on an executable file according to one embodiment of the invention.

FIG. 8 is a block diagram of an illustration of one embodiment of system runtime, which performs or facilitates object file modification on an executable file according to one embodiment of the invention. In one embodiment, a runtime object modification system 800 can modify executable or object files loaded from nonvolatile memory 815 and adjust the compiled machine code to relocate the local variables of functions in a process. A data processing system, such as the data processing system 100 of FIG. 1, can contain a processing system 810 containing one or more processors. The processing system 810 can direct an operating system 822 running in system memory 820 to perform object code modification 827 via a System Runtime 825. In one embodiment, the operating system 822 has an Application Launch Framework 832, which launches applications stored in the nonvolatile memory 815 of the data processing system. The Application Launch Framework 822 can load an application into system memory 820, where a System Runtime 825 can modify the machine code to redirect the stack frame addresses using object code modification 827. In one embodiment, the System Runtime 825 contains a Stack Manager 828 module, which allocates, de-allocates, and maintains the stack pools (e.g. Static Stack Pool 850 and Dynamic Stack Pool 855). In one embodiment, a compiler performs object code modification at compile time, and generates machine code which can interface with a Stack Manager 828 to request and manage local variable relocation. It is to be noted that the runtime and compile time method of modifying object code are not mutually exclusive, and both systems and methods can operate alone, or in combination, on the data processing system.

In one embodiment, after an application is loaded into system memory, the System Runtime 825 can spawn a process for the application within a virtual memory address range defined as process memory space 840. The process memory space 840 can contain the conventional process memory segments, including a process stack 845, which can contain linkage data for the stack frames of the process functions. In one embodiment, local variables 842 are relocated to a Static Stack Pool 850, and are not stored in process memory space. In one embodiment, a dynamic stack pool 855 is available in the event the Static Stack Pool 850 overflows. Alternatively, in one embodiment, a Dynamic Stack Pool 855 is used for secondary threads of a process, while main threads are allocated in the Static Stack Pool 850.

FIG. 9 is a block diagram illustrating a schematic view of stack allocation per thread 800 according to one embodiment of the invention. In one embodiment, a Static Global Stack 902 can be allocated at system start, and Thread One of Process One 910 can request, and is allocated space to store local variables. In one example of such embodiment, a Stack Pool Sub-Allocation 904 for Thread One of Process One 910 can contain Stack Frame A 912, which can store information for an example Function A of the thread, followed by Stack Frame B 914 in the event Function A were to call Function B. In one embodiment, a thread can specify optional Fence Data 916 to protect an example Stack Frame C 918 which is known to contain data, which should be isolated from other stack frames.

In one embodiment, an example Thread One of Process Two 920 is initialized and assigned a position in the Static Global Stack 902, and can maintain a sub allocation for stack frames similar to that of Thread One of Process One 910. In one embodiment, Thread One of Process Two 920 can request an obfuscated stack, which, in addition to being stored in an unconventional virtual memory location outside of the process address space, is also stored in an unconventional manner, such as, for example, Obfuscated Stack Pool 710 of FIG. 7.

In one embodiment, a Dynamic Stack 906 can be allocated in the system Heap Pool to serve as an overflow stack. For example, Process Two can spawn Thread Two 930, which can be allocated a location in a Dynamic Stack 906 to store local variables. In one embodiment, a compiler utility can allocate a data structure in the system heap and adjust the local variable references to redirect them to the Dynamic Stack 906 instead of the system stack. In one embodiment, the runtime system can dynamically adjust compiled machine code during process initialization to re-direct stack information to the Dynamic Stack 906. In one embodiment, Thread Two of Process One 932 can be spawned from Process One and is allocated a location on the Dynamic Stack 906. In one embodiment of the invention, the main thread of a process is allocated space on a Static Global Stack 902, while additional threads are allocated in the Dynamic Stack 906. Such embodiment can also encompass Thread Three of Process Two 934, which can also be stored on a Dynamic Stack 906, while the main thread of Process Two is stored in the Static Global Stack 902 to avoid the processing delay associated with allocating a Dynamic Stack 906. In one embodiment, Dynamic Stack 906 use is indicated via a compile time compiler switch and object code to use the Dynamic Stack 906 is generated during compilation. In such embodiment, the Dynamic Stack 906 can be specific to a process, such that all threads, and only the threads of a single process are allocated space in the Dynamic Stack 906, but each process may have its own Dynamic Stack 906 allocation. In one embodiment, the Dynamic Stack 906 is managed by the runtime system and can implement a lock and unlock system, to ensure atomic access to the Dynamic Stack 906 when used by multiple processes. In one embodiment, a locking system may also be used for the Static Global Stack 902.

In one embodiment, Data Structure Metadata 940 takes up some space on the dynamic stack to maintain information as to the various allocations. For example, the Dynamic Stack 906 can be implemented as a linked list of stack data structures, to which pointer data can be stored in an indexed list in the Data Structure Metadata 940. In one embodiment, linked list pointers are instead directly associated with each thread instead of being stored in an indexed fashion in the Data Structure Metadata 940.

In the event the Dynamic Stack 906 is exhausted, one embodiment of the invention can allow a Dynamic Data Structure Additional Allocation 908, where, instead of a stack overflow, additional stack space can be dynamically allocated and linked with one or more Dynamic Stacks 906. In one embodiment, an additional allocation can be made on a per-thread basis, if a process spawns an additional thread for which no stack space is available. For example, if a process, such as Process One, was to Spawn Thread Three 960, and the Dynamic Stack 906 was full, additional stack space can be dynamically allocated on the system heap to avoid a stack overflow. In one embodiment, Data Structure Metadata 952 can maintain stack structure information, such as, for example, whether the Dynamic Data Structure Additional Allocation 908 is associated with a specific Dynamic Stack 906, or if it is a process specific allocation.

Figure 10:
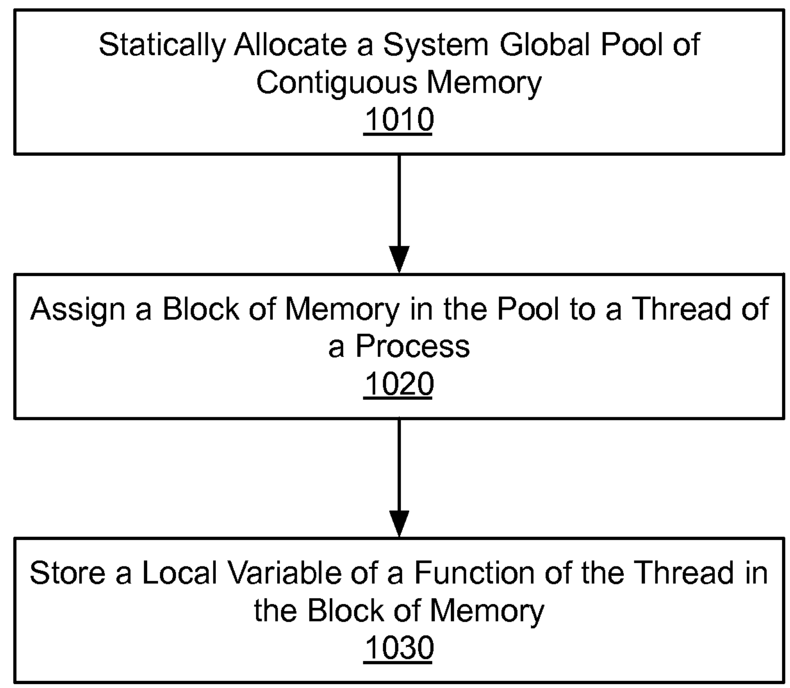
FIG. 10 is a flow diagram of one embodiment of a method obfuscated stack allocation in a pre-allocated stack according to one embodiment of the invention.

FIG. 10 illustrates a flow diagram of one embodiment of a method Obfuscated Stack Allocation in a Pre-Allocated Stack 1000 according to one embodiment of the invention. In one embodiment, at system start time a data processing system can statically allocate a system global pool of contiguous memory in operation 1010. In one embodiment, all processes have the local variables of their main thread relocated to the global stack pool, and the runtime system can perform an operation 1020 to assign a block of memory in the pool to a thread (e.g. the main thread) of a process at during process initialization. In one embodiment, the runtime system can, in operation 1030, adjust the object code such that the local variables of each function in the thread of a process are re-directed dynamically to the pre-allocated stack pool. In one embodiment, the runtime system libraries indicate that a system pre-allocated and dedicated stack pool is available, such that, via a compile switch, objects can be generated by a compiler or compiler utility to use, or request to use, such pre-allocated and dedicated stack pool.

Figure 11:
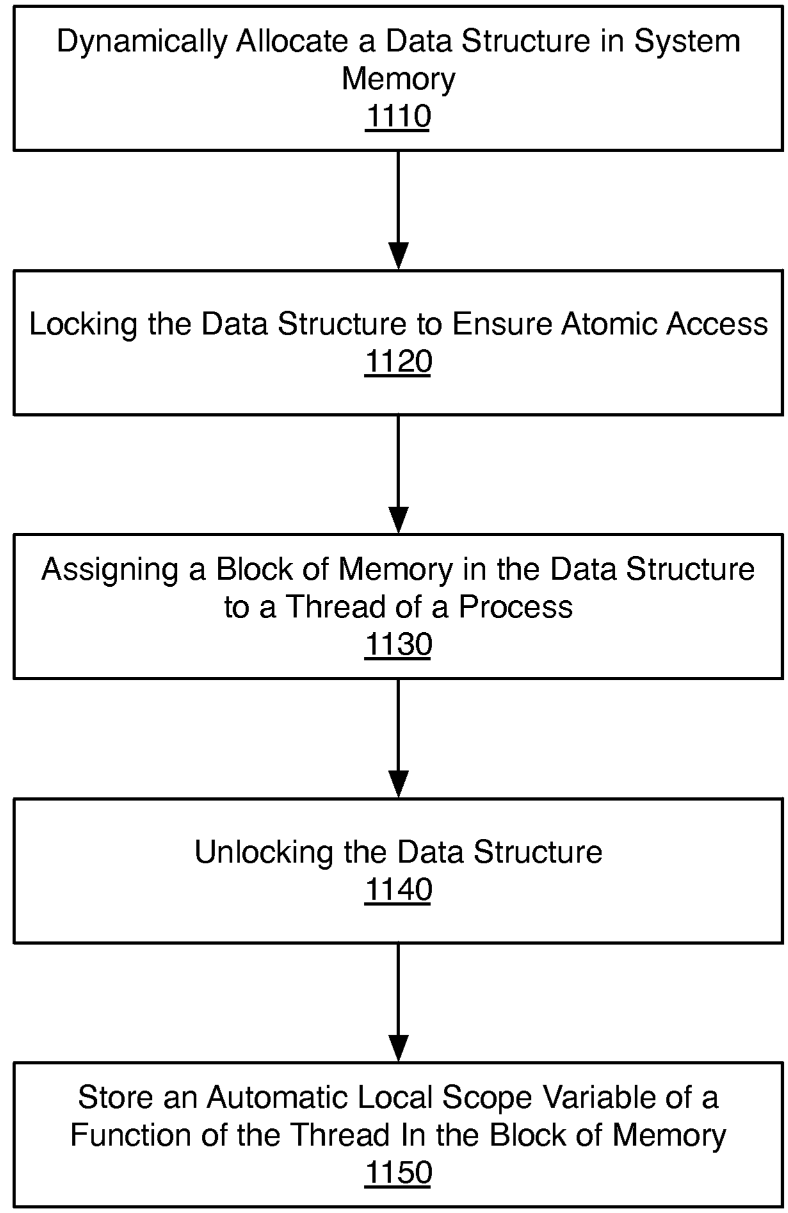
FIG. 11 is a block diagram of one embodiment of a method of obfuscated stack allocation in a dynamic stack according to one embodiment of the invention.

FIG. 11 is a block diagram of one embodiment of a method 1100 of Obfuscated Stack Allocation in a Dynamic Stack according to one embodiment of the invention. In one embodiment, a specialized compiler configured to provide obfuscated stack functionality could perform an operation 1110 to dynamically allocate a data structure in system memory by adjusting pointers and memory references for local variables during machine code generation. In one embodiment, a runtime system can dynamically adjust machine code to re-direct one or more elements from the stack in process memory space to a dynamic stack pool data structure in system memory. In one embodiment, a dynamic stack can allow concurrent access from multiple processes, and can provide support for an operation 1120 which can lock the data structure to ensure atomic access during stack space assignment for a thread. For example, in a compiler based embodiment, machine code can be generated which can request a stack space allocation for the stack frame of a function, and a runtime can use a locking mechanism to arbitrate allocations and de-allocations to a runtime system managed dynamic stack in system heap space. On such embodiment, once a lock is attained, an operation 1130 can be performed to assign a block of memory in the data structure to a thread of a process requesting the stack space allocation.

In one embodiment, once the stack space is assigned, an operation 1140 can be performed to unlock the data structure, allowing other threads to access the dynamic stack pool. The thread of the process, having been allocated space on the dynamic stack pool, can then store automatic local scope variables for one or more functions of the thread in the block of memory allocated for the one or more dynamic stack frames.

Figure 12:
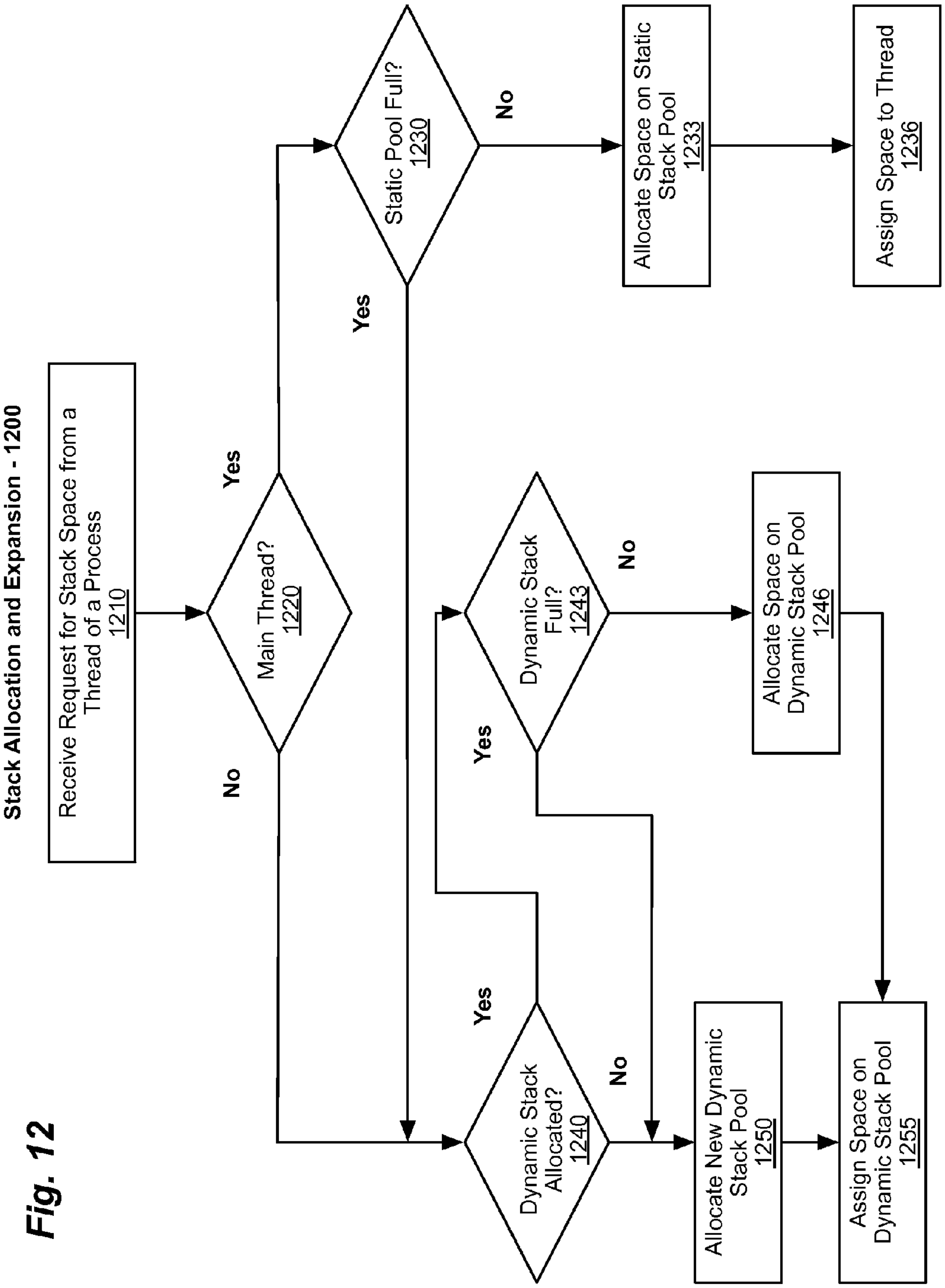
FIG. 12 is a flow diagram of one embodiment of a method of stack allocation and expansion that makes use of stack and dynamic stack pools according to one embodiment of the invention.

FIG. 12 is a flow diagram of one embodiment of a method 1200 of stack allocation and expansion that makes use of stack and dynamic stack pools according to one embodiment of the invention. In one embodiment, a runtime system can receive a request 1210 for obfuscated stack space for a thread of a process, which can determine, in operation 1220 whether the thread is the main thread of a process or a secondary or tertiary thread of the process. In one embodiment, process main threads are allocated in a pre-allocated static pool to avoid process initialization delay during dynamic stack pool allocation. In such embodiment, an operation 1230 can determine if the Static Pool is full, and if space is available, the runtime system can, in operation 1233, allocate space on the Static Stack Pool, and then perform an operation 1236 to assign space to the thread.

In one embodiment, if the Static Stack Pool is full, or if the requesting thread is not the main thread (or first thread) of a process, the runtime can perform operation 1240 to determine if a Dynamic Stack Pool is allocated. In such embodiment, a Dynamic Stack Pool may not be initially allocated by the system, and will be allocated when required. For example, if only a limited number of processes are configured or compiled to use an embodiment of an obfuscated stack, the Static Pool may be sufficient stack space for requesting threads of such processes. Alternatively, a program can be compiled such that it will allocate private stack space at process initialization time for its threads. If there is an available Dynamic Stack Pool, in one embodiment, an operation 1243 can determine if that pool is full, or if it can accept new stack allocations. If there is space available on a Dynamic Stack Pool, an operation 1246 can allocate space on the Dynamic Stack Pool. If the Dynamic Stack Pool is full, a new Dynamic Pool can be allocated in operation 1250. Such pool can be specific to a thread or a process, or can, if allocated by the runtime system, be large enough to accept multiple threads from multiple processes, using a locking algorithm to ensure atomic access. Once stack pool space is available, operation 1255 can be used to assign space to the requesting thread.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The various aspects, embodiments, implementations, or features of the embodiment can be used separately or in any combination.

The described embodiments can also be embodied as computer readable code on a non-transitory computer readable medium. A non-transitory computer readable medium is any data storage device that can store data which can thereafter be read by a computer system, other than medium designed specifically for propagating transitory signals. Examples of non-transitory computer readable media include floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions. In various embodiments, software-instructions stored on a machine-readable storage medium can be used in combination with hardwired circuitry to implement the present invention. Thus, the techniques are not limited to any specific combination of hardware circuitry and software instructions, or to any particular source for the instructions executed by the data processing system associated with an apparatus for performing one or more of the operations described herein.

What is claimed is:

1. A non-transitory computer-readable medium with instructions stored therein, the instructions, when executed by a processing system, cause the processing system to perform operations, the operations comprising:

statically pre-allocating a system global memory pool in a contiguous range of random access memory;

assigning a block of memory in the system global memory pool to an execution thread of a process having a virtual memory range; and storing a local variable of a function of the thread in the block of memory, wherein the local variable is stored outside of the virtual memory range of the process and is hidden from a stack frame back-trace.

2. The computer-readable medium as in claim 1, wherein statically pre-allocating a system global memory pool comprises allocating memory from a secure memory region.

3. The computer-readable medium as in claim 1, further comprising:

dynamically allocating a data structure in system memory;

locking the data structure to ensure atomic access;

assigning a block of memory in the data structure to a thread of the process; and unlocking the data structure.

4. The computer-readable medium as in claim 3, wherein the local variable of a function is hidden from a stack frame back-trace by modifying machine code of the process.

5. The computer-readable medium as in claim 4, further comprising dynamically allocating additional space in the data structure.

6. The computer-readable medium as in claim 5, further comprising storing function linkage data in the block of memory.

7. The computer-readable medium as in claim 6, further comprising storing a process data segment in the block of memory.

8. A computer-implemented method at a data processing system, the method comprising:

statically pre-allocating a global memory pool in a contiguous range of random access memory;

assigning a first block of memory in the pre-allocated memory pool to the main thread of a process having a virtual memory range;

storing a local variable of a function of the main thread in the block of memory, wherein the local variable is hidden from a stack frame back-trace;

dynamically allocating a data structure in system memory;

locking the data structure to ensure atomic access;

assigning a second block of memory in the data structure to a second thread of a process;

unlocking the data structure; and storing a local variable of a function of the second thread in the block of memory, wherein the local variable is stored outside of the process virtual memory range.

9. The method as in claim 8, further comprising storing function linkage data in the first or second block of memory.

10. The method as in claim 9, further comprising storing a process data segment in the first or second block of memory.

11. A computer-implemented method at a data processing system, the method comprising generating machine code on a non-transitory computer readable medium for a program written in a high level language, the machine code to perform operations comprising:

dynamically allocating, a first data structure in system memory;

requesting a lock of the data structure to ensure atomic access;

requesting a first block of memory in the data structure;

assigning the first block of memory to a stack frame of a function in an application;

releasing the lock on the data structure; and storing a local variable of a function in the block of requested memory, such that the local variable is hidden from a stack frame back-trace.

12. The computer-implemented method as in claim 11, further comprising:

requesting an allocation on a first dynamically allocated data structure;

dynamically allocating a second data structure in system memory when the first data structure is full; and linking the first data structure to the second data structure.

13. The computer-implemented method as in claim 12, further comprising:

requesting, through a runtime system programming interface, a memory allocation on a system global stack pool;

assigning the allocated memory to a stack frame of a function in an application; and storing a local variable of the function in allocated memory, such that the local variable is hidden from a stack frame back-trace.

14. A non-transitory computer-readable medium with instructions stored therein, the instructions, when executed by a processing system, cause the processing system to perform operations comprising the method of claim 13.

15. A non-transitory computer-readable medium with instructions stored therein, the instructions, when executed by a processing system, cause the processing system to perform operations comprising the method of claim 11.

16. A data processing apparatus comprising:

a non-transitory computer-readable medium for storing instructions;

a processing system comprising one or more processors having one or more cores, to execute instructions stored on the non-transitory computer-readable medium;

a system runtime, stored on the non-transitory computer-readable medium and executed by the processing system, the system runtime to, allocate a system global pool in a contiguous range of random access memory, assign a first block of memory in the system global pool to a first thread of a running process, and modify a process's machine code to store a local variable of a function of the first thread in the first block of memory, such that the local variable is hidden from a stack frame back-trace.

17. The data processing apparatus of claim 16,wherein the system runtime is further to dynamically allocate a second data structure in system memory and modify a process's machine code to store a local variable of a function of a second thread in a second block of memory such that the local variable is hidden from a stack frame back-trace.

18. The data processing apparatus of claim 17, wherein the first and second block of memory are outside of virtual memory address space of the running process.

19. The data processing apparatus of claim 18, wherein the system runtime is to allocate the system global pool in a contiguous range of system heap memory.

20. The data processing apparatus of claim 19, wherein the system runtime, before the process's machine code is modified to store the local variable of the function of the second thread, is further to:

lock the second data structure;

assign the second block of memory to the second thread; and unlock the second data structure.

* * * * *